(12) United States Patent
Dutta et al.

(10) Patent No.: US 11,671,164 B2
(45) Date of Patent: Jun. 6, 2023

(54) BEAM FAILURE DETECTION AND RECOVERY FOR SIDELINK USER EQUIPMENTS

(71) Applicant: QUALCOMM Incorporated, San Diego, CA (US)

(72) Inventors: Sourjya Dutta, San Diego, CA (US); Kapil Gulati, Belle Mead, NJ (US); Gabi Sarkis, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 17/169,143

(22) Filed: Feb. 5, 2021

(65) Prior Publication Data

US 2022/0255615 A1    Aug. 11, 2022

(51) Int. Cl.
| | |
|---|---|
| *H04B 7/08* | (2006.01) |
| *H04B 17/336* | (2015.01) |
| *H04W 76/19* | (2018.01) |
| *H04W 76/27* | (2018.01) |
| *H04L 1/00* | (2006.01) |
| *H04L 1/1829* | (2023.01) |
| *H04L 1/20* | (2006.01) |
| *H04L 5/00* | (2006.01) |

(Continued)

(52) U.S. Cl.
CPC .......... *H04B 7/088* (2013.01); *H04B 17/336* (2015.01); *H04L 1/0004* (2013.01); *H04L 1/1832* (2013.01); *H04L 1/203* (2013.01); *H04L 5/0055* (2013.01); *H04W 72/20* (2023.01); *H04W 74/0833* (2013.01); *H04W 76/19* (2018.02); *H04W 76/27* (2018.02)

(58) Field of Classification Search
CPC ..... H04B 7/088; H04B 17/336; H04W 76/27; H04W 72/0406; H04W 74/0833; H04W 36/0033; H04L 1/0004; H04L 1/1832; H04L 1/203; H04L 5/0055; H04L 47/10
See application file for complete search history.

(56) References Cited

U.S. PATENT DOCUMENTS

| | | | |
|---|---|---|---|
| 2020/0112400 A1* | 4/2020 | Lee .................. | H04L 5/0055 |
| 2020/0228247 A1* | 7/2020 | Guo ................... | H04W 52/383 |

(Continued)

FOREIGN PATENT DOCUMENTS

| | | |
|---|---|---|
| WO | 2020032653 A1 | 2/2020 |
| WO | 2020198586 A1 | 10/2020 |

OTHER PUBLICATIONS

Partial International Search Report—PCT/US2022/070116—ISA/EPO—dated May 9, 2022.

(Continued)

*Primary Examiner* — Mewale A Ambaye
(74) *Attorney, Agent, or Firm* — Harrity & Harrity LLP/Qualcomm Incorporated

(57) ABSTRACT

Various aspects of the present disclosure generally relate to wireless communication. In some aspects, a receiving (Rx) user equipment (UE) may receive, from a transmitting (Tx) UE, sidelink control information (SCI). The Rx UE may determine an Rx-side block error rate (BLER) based at least in part on the SCI. The Rx UE may perform a beam failure recovery based at least in part on the Rx-side BLER satisfying a threshold. Numerous other aspects are described.

30 Claims, 11 Drawing Sheets

(51) Int. Cl.
*H04W 74/08* (2009.01)
*H04W 72/20* (2023.01)

(56) References Cited

U.S. PATENT DOCUMENTS

| | | | |
|---|---|---|---|
| 2020/0336253 A1* | 10/2020 | He | H04W 4/40 |
| 2020/0413393 A1 | 12/2020 | Luo et al. | |
| 2021/0051594 A1* | 2/2021 | Chae | H04W 52/242 |
| 2021/0105055 A1* | 4/2021 | Chae | H04L 1/0026 |
| 2021/0127383 A1* | 4/2021 | Hui | H04L 1/1864 |
| 2021/0336688 A1* | 10/2021 | Lee | H04W 48/16 |

OTHER PUBLICATIONS

International Search Report and Written Opinion—PCT/US2022/070116—ISA/EPO—dated Jun. 30, 2022.

* cited by examiner

BEAM FAILURE DETECTION AND RECOVERY FOR SIDELINK USER EQUIPMENTS

FIELD OF THE DISCLOSURE

Aspects of the present disclosure generally relate to wireless communication and to techniques and apparatuses for beam failure detection and recovery for sidelink user equipments (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of UEs. A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a receiving (Rx) UE includes receiving, from a transmitting (Tx) UE, sidelink control information (SCI); determining an Rx-side block error rate (BLER) based at least in part on the SCI; and performing a beam failure recovery based at least in part on the Rx-side BLER satisfying a threshold.

In some aspects, a method of wireless communication performed by a Tx UE includes determining a Tx-side BLER based at least in part on whether feedback is received from an Rx UE over a physical sidelink feedback channel (PSFCH); and performing a beam failure recovery based at least in part on the Tx-side BLER satisfying a threshold.

In some aspects, an Rx UE for wireless communication includes a memory and one or more processors operatively coupled to the memory, the memory and the one or more processors configured to: receive, from a Tx UE, SCI; determine an Rx-side BLER based at least in part on the SCI; and perform a beam failure recovery based at least in part on the Rx-side BLER satisfying a threshold.

In some aspects, a Tx UE for wireless communication includes a memory and one or more processors operatively coupled to the memory, the memory and the one or more processors configured to: determine a Tx-side BLER based at least in part on whether feedback is received from an Rx UE over a PSFCH; and perform a beam failure recovery based at least in part on the Tx-side BLER satisfying a threshold.

In some aspects, a non-transitory computer-readable medium storing a set of instructions for wireless communication includes one or more instructions that, when executed by one or more processors of an Rx UE, cause the Rx UE to: receive, from a Tx UE, SCI; determine an Rx-side BLER based at least in part on the SCI; and perform a beam failure recovery based at least in part on the Rx-side BLER satisfying a threshold.

In some aspects, a non-transitory computer-readable medium storing a set of instructions for wireless communication includes one or more instructions that, when executed by one or more processors of a Tx UE, cause the Tx UE to: determine a Tx-side BLER based at least in part on whether feedback is received from an Rx UE over a PSFCH; and perform a beam failure recovery based at least in part on the Tx-side BLER satisfying a threshold.

In some aspects, an Rx apparatus for wireless communication includes means for receiving, from a Tx apparatus, SCI; means for determining an Rx-side BLER based at least in part on the SCI; and means for performing a beam failure recovery based at least in part on the Rx-side BLER satisfying a threshold.

In some aspects, a Tx apparatus for wireless communication includes means for determining a Tx-side BLER based at least in part on whether feedback is received from an Rx apparatus over a PSFCH; and means for performing a beam failure recovery based at least in part on the Tx-side BLER satisfying a threshold.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
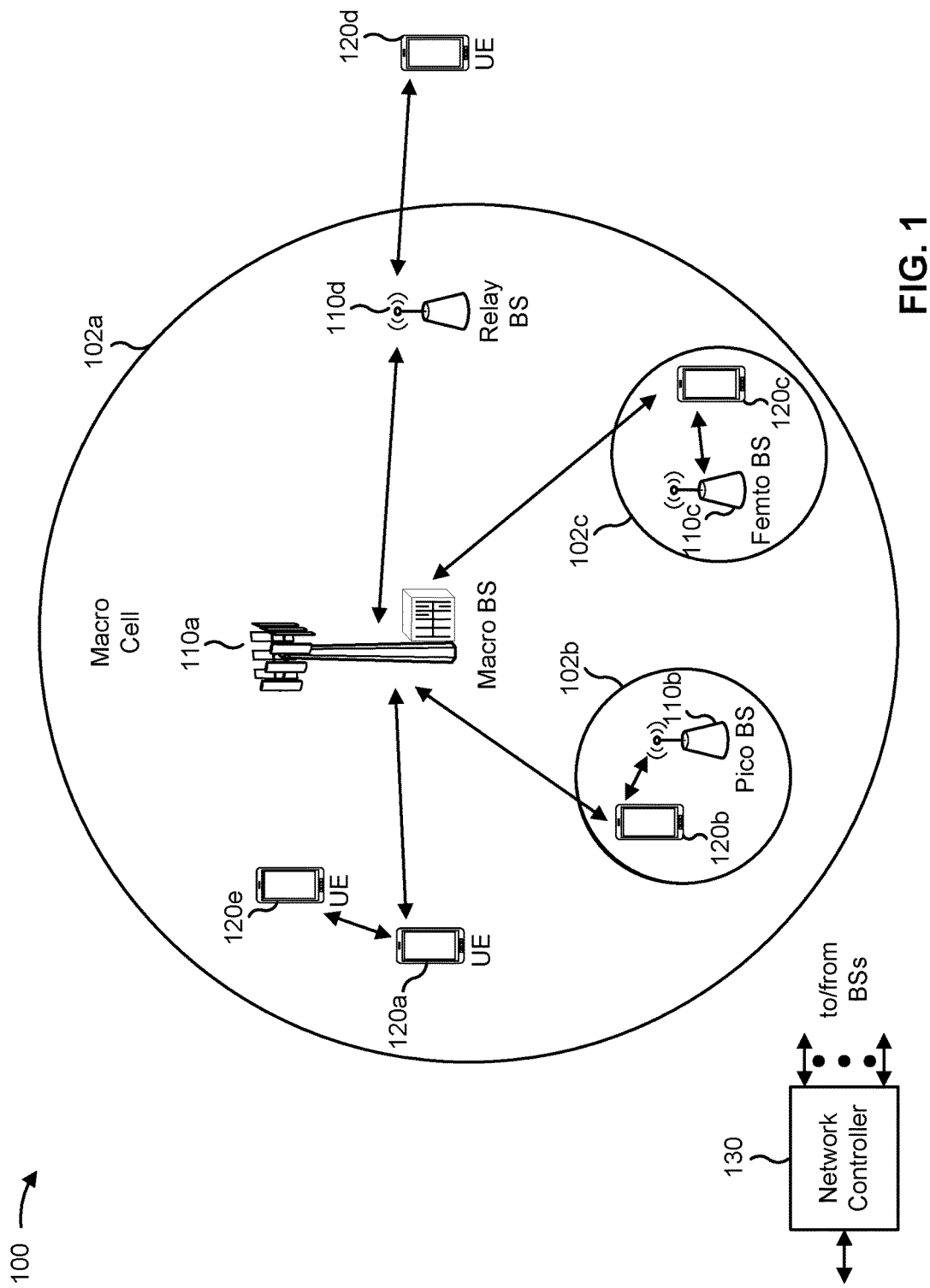
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
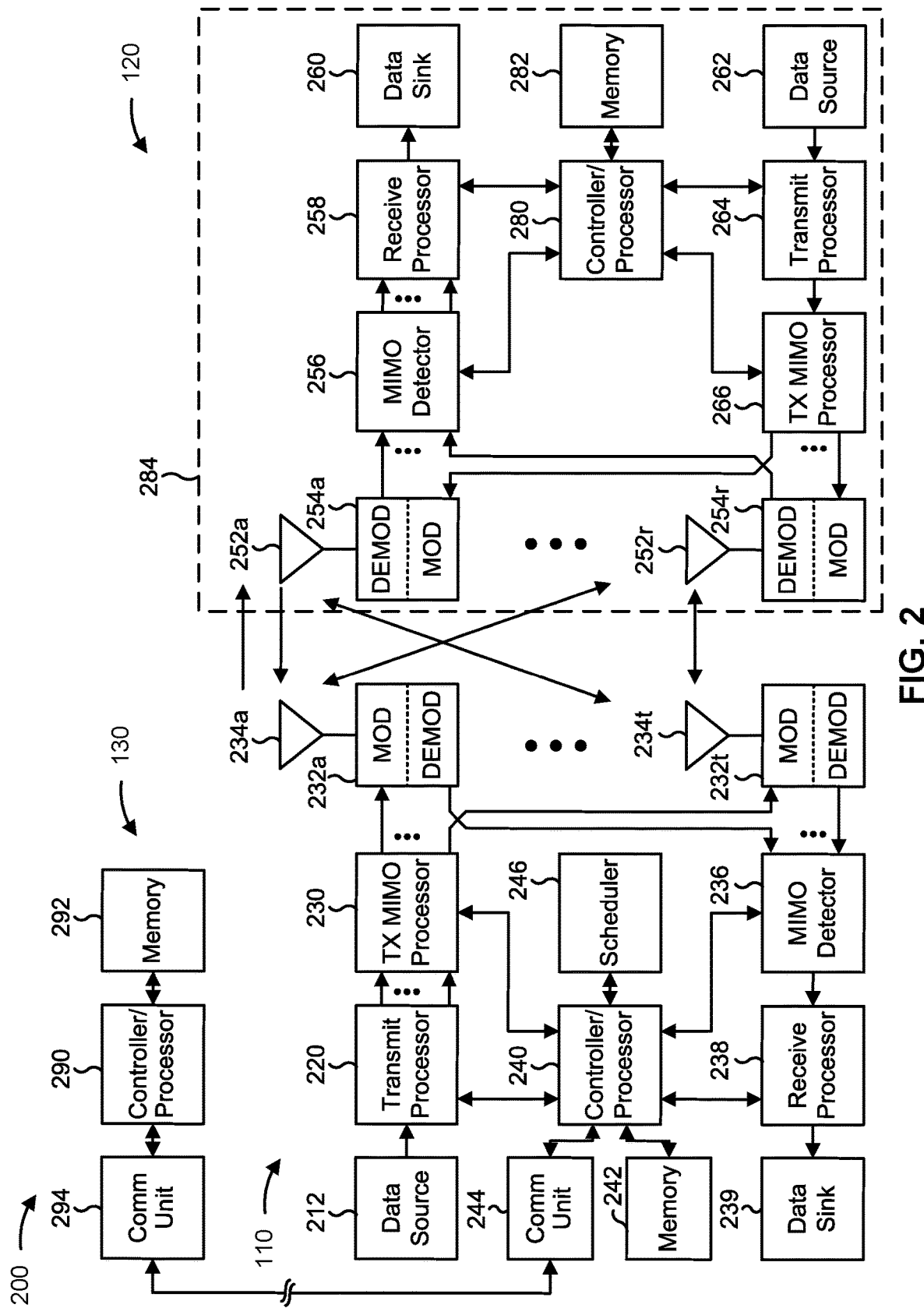
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 11 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-9.

Controller/processor 240 of base station 110, controller/processor 280 of UE 120, and/or any other component(s) of FIG. 2 may perform one or more techniques associated with beam failure detection and recovery for sidelink UEs, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, an Rx UE (e.g., UE 120*a*) includes means for receiving, from a Tx UE, SCI; means for determining an Rx-side BLER based at least in part on the SCI; and/or means for performing a beam failure recovery based at least in part on the Rx-side BLER satisfying a threshold. The means for the Rx UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the SCI includes sidelink control information part 1 (SCI-1) and sidelink control information part 2 (SCI-2), and the Rx UE includes means for determining a signal-to-interference-plus-noise ratio (SINR) from a demodulation reference signal (DMRS) associated with the SCI-1, wherein the SINR is determined from the DMRS based at least in part on a decoding of the SCI-2; and/or means for determining the Rx-side BLER based at least in part on the SINR and a fixed SCI transport block size.

In some aspects, the Rx UE includes means for determining one or more of the Rx-side BLER, a Tx-side BLER, or a combination thereof based at least in part on one of more of: a traffic periodicity, a traffic priority, a traffic type, or a combination thereof; and/or means for determining a beam or link failure when one or both of the Rx-side BLER or the Tx-side BLER satisfies a threshold.

In some aspects, the Rx UE includes means for receiving beam training reference signals (BT-RSs) on system-wide beam training occasions; and/or means for transmitting a random access channel (RACH) sequence on a direction with a BT-RS signal quality or power that satisfies a threshold.

In some aspects, the Rx UE includes means for transmitting an indication that the beam failure recovery is not successful to enable a session disconnection.

In some aspects, a Tx UE (e.g., UE 120*e*) includes means for determining a Tx-side BLER based at least in part on whether feedback is received from an Rx UE over a PSFCH; and/or means for performing a beam failure recovery based at least in part on the Tx-side BLER satisfying a threshold. The means for the Tx UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the Tx UE includes means for decreasing an MCS associated with an SCI-2 to obtain an updated MCS; and/or means for determining the Tx-side BLER based at least in part on the updated MCS.

In some aspects, the Tx UE includes means for transmitting, to the Rx UE, a reconfiguration message indicating for the Rx UE to modify an MCS associated with an SCI-2, based at least in part on the Tx-side BLER satisfying the threshold and an Rx-side BLER not satisfying the threshold.

In some aspects, the Tx UE includes means for performing a beam sweep to reconfigure beam pair links with the Rx UE.

In some aspects, the Tx UE includes means for negotiating, with the Rx UE, one or more beam training reference signals and one or more random access channel sequences for the beam failure recovery.

In some aspects, the Tx UE includes means for negotiating, with the Rx UE, one or more beam training reference signals and one or more random access channel sequences for beam training including the beam failure recovery.

In some aspects, the Tx UE includes means for negotiating, with the Rx UE, a fixed time division duplex pattern to listen for connection requests from the Rx UE after the beam failure is mitigated.

In some aspects, the Tx UE includes means for transmitting BT-RSs in a plurality of directions in a system-wide resource allocated for beam training, wherein the BT-RSs are selected from a pre-negotiated set for BT-RSs, and the BT-RSs are transmitted until a new link is established with the Rx UE.

In some aspects, the Tx UE includes means for transmitting BT-RSs based at least in part on a negotiated time division duplex pattern; means for receiving, from the Rx UE, a radio resource control (RRC) reconfiguration request message, wherein the RRC reconfiguration request message is received in a direction that corresponds to a direction at which a random access channel message is received from the Rx UE; means for transmitting a response in one or more directions based at least in part on a receipt of the RRC reconfiguration request message; and/or means for reestablishing a link with the Rx UE based at least in part on a power level associated with the one or more directions.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
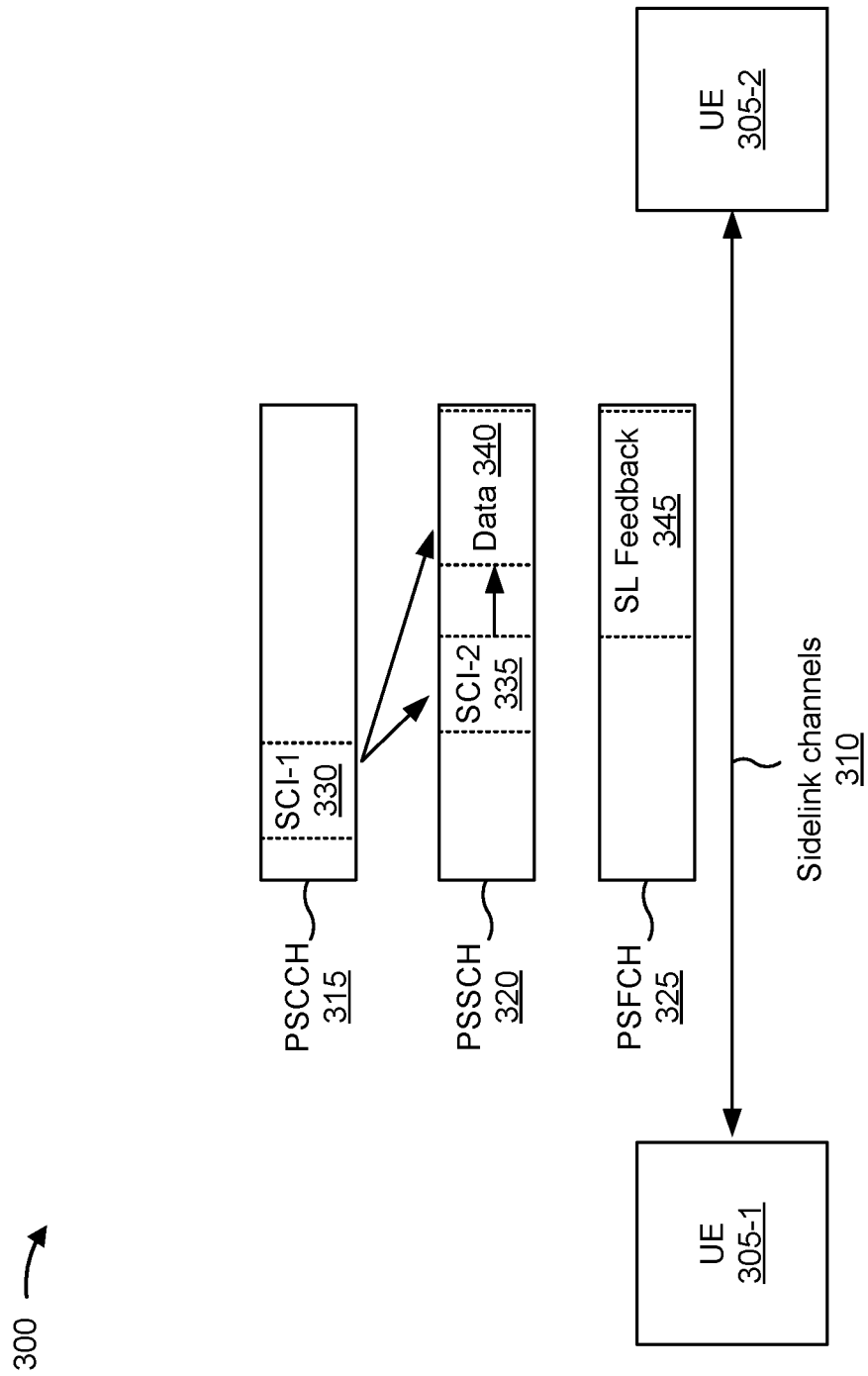
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. In some aspects, the UEs 305 (e.g., UE 305-1 and/or UE 305-2) may include one or more other UEs described elsewhere herein, such as UE 120. In some aspects, the one or more sidelink channels 310 may use a PC5 interface, may operate in a high frequency band (e.g., the 5.9 GHz band), may operate on an unlicensed or shared frequency band (e.g., an NR unlicensed (NR-U) frequency band), and/or the like. Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a PSFCH 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel.

The PSCCH 315 may carry SCI-1 330, which may indicate various control information used for sidelink communications. The control information may include an indication of one or more resources (e.g., time resources, frequency resources, spatial resources, and/or the like) where various types of information may be carried on the PSSCH 320, information for decoding sidelink communications on the PSSCH 320, a quality of service (QoS) priority value, a resource reservation period, a PSSCH demodulation reference signal (DMRS) pattern, a an SCI format and a beta offset for SCI-2 335 transmitted on the PSSCH 320, a quantity of PSSCH DMRS ports, a modulation coding scheme (MCS), and/or the like.

The information carried on the PSSCH 320 may include the SCI-2 335 and/or data 340. The SCI-2 335 may include various types of information, such as a hybrid automatic repeat request (HARQ) process ID, a new data indicator (NDI) associated with the data 340, a source identifier, a destination identifier, a channel state information (CSI) report trigger, and/or the like. In some aspects, a UE 305 may transmit both the SCI-1 330 and the SCI-2 335. In some aspects, a UE 305 may transmit only SCI-1 330, in which case one or more types of the information that would otherwise be transmitted in the SCI-2 335 may be transmitted in the SCI-1 330 instead.

The PSFCH 325 may be used to communicate sidelink feedback 345, such as HARQ feedback (e.g., acknowledgement or negative acknowledgement (ACK/NACK) information), transmit power control (TPC), a scheduling request (SR), and/or the like.

As indicated above, FIG. 3 is provided as an example. Other examples may differ from what is described with respect to FIG. 3.

Figure 4:
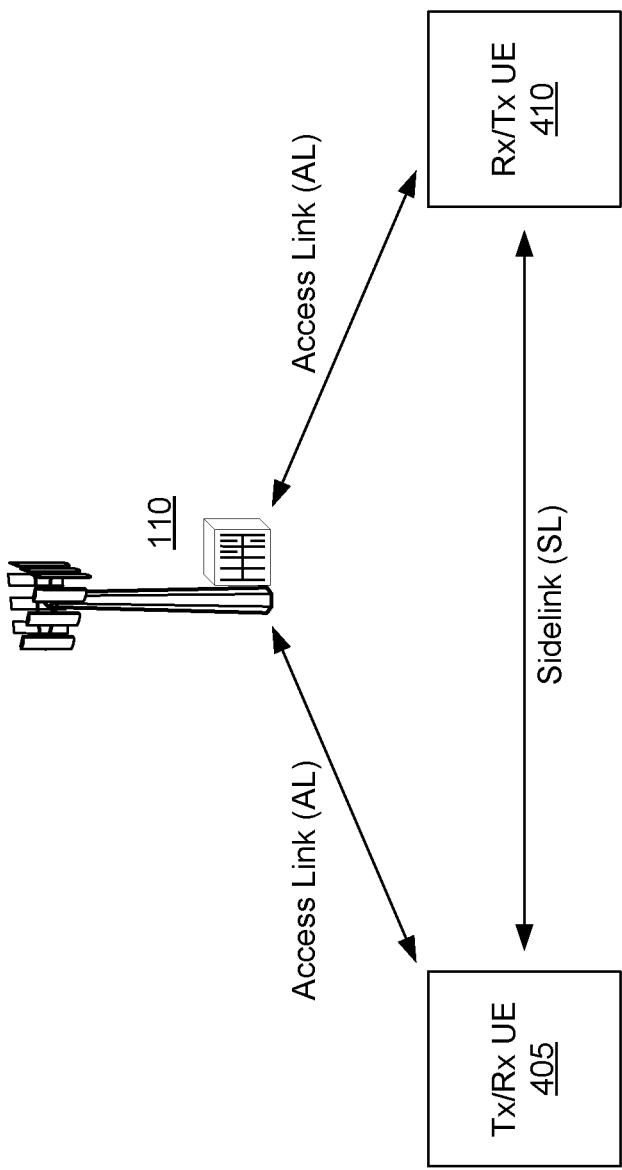
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a Tx/Rx UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
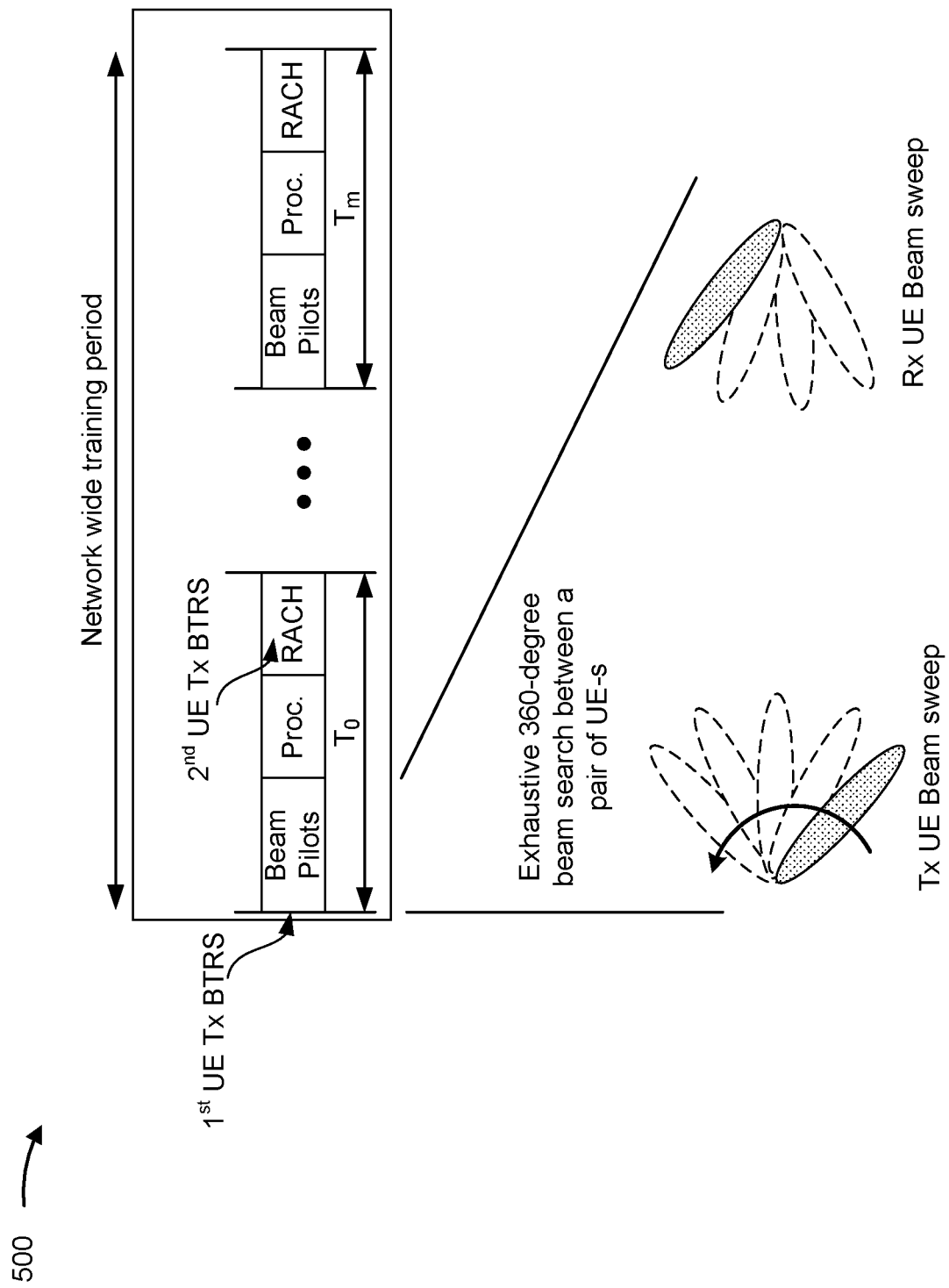
FIG. 5 is a diagram illustrating an example of beam training, in accordance with the present disclosure.

FIG. 5 is a diagram illustrating an example of a beam training, in accordance with the present disclosure.

As shown in FIG. 5, during a beam training procedure in FR2, a Tx UE may transmit beam pilot signals in a network. The beam pilot signals may be BT-RSs. The Tx UE may transmit the beam pilot signals during a network wide training period. The Tx UE may transmit the beam pilot signals over 360 degrees, and another Rx UE in the network may perform an Rx beam sweep. In other words, the Tx UE may perform a Tx UE beam sweep and an Rx UE may perform an Rx UE beam sweep, thereby resulting in an exhaustive 360-degree beam search between the pair of Tx and Rx UEs. After the Rx beam sweep is performed, the Rx UE may determine a dominant direction for one or more beam pilot signals received from the Tx UE (e.g., every BT-RS sequence received at the Rx UE). The dominant direction may correspond to a beam pilot signal that is received with a higher power level as compared to other beam pilot signals. The Rx UE may process the one or more beam pilot signals, and may transmit a RACH sequence or a beam training response preamble in the dominant direction. For example, a first UE Tx BT-RS and a second UE Tx RACH may occur, being separated by a processing time. The Tx UE and the Rx UE may have information on beam directions based at least in part on the Tx UE beam sweep and the Rx UE beam sweep, and then the Tx and Rx UEs may discover each other by associating a beam pair link (BPL) to a peer UE.

As indicated above, FIG. 5 is provided as an example. Other examples may differ from what is described with respect to FIG. 5.

For sidelink communications over FR2, FR2 links may use beamforming to allow sidelink communications over a given range, due to relatively high pathloss. Beam search and periodic beam training may be used to maintain the FR2 links. Sidelink communications allow for device-to-device communication, with or without assistance from a base station. Further, sidelink networks may be distributed, such that each device may maintain communication links with multiple peer devices. For example, a UE may maintain sidelink communication links with multiple other UEs.

Sidelink communication over FR2, or a millimeter (mmWave) band, may be different than communication for cellular applications. The cellular applications may be associated with access link communications between base stations and UEs. For example, in cellular, a UE may maintain a link with one base station (e.g., a Uu interface), or one access point in a WiFi scenario. In sidelink, UEs may create and monitor multiple beam pair links with other UEs.

For distributed sidelink communication over FR2, network-wide periodic resources may be semi-statically configured for beam search and training. These resources may span a relatively long period, as multiple UEs may create/maintain links with one another. These resources may occur with longer periods to reduce overhead. For example, a 100 ms beam training window may be configured every 1000 ms, thereby resulting in 10% overhead. Beam search and training may be performed between network-wide resources to enhance link throughput and reliability.

Radio link monitoring (RLM) and beam/link failure detection mechanisms, such as radio link failure (RLF) detection, may be applicable to sidelink communications over FR2. A beam/link failure may be a link condition at which control decoding fails with a probability that satisfies a threshold. In sidelink, two peer UEs may need to determine and mitigate the link/beam failure without periodic reference signals from the base station.

For FR2 cellular (Uu interface) applications, RLM may be performed based at least in part on periodic reference signals. A UE may use a periodic channel state information reference signal (CSI-RS), or a PSS or an SSS, to determine a hypothetical BLER for a control channel. Other UEs may receive an indication that the CSI-RS or the SSS are scheduled at a fixed periodicity. When a PDCCH hypothetical BLER does not satisfy a threshold (e.g., a PDCCH hypothetical BLER falls below a threshold), UEs may trigger a link failure mitigation procedure.

Sidelink networks may be distributed in nature, such that each UE may have multiple connections with multiple other UEs. Sidelink networks may not have a provision for periodic reference signals or synchronization signals between two UEs. Further, a base station may transmit synchronization signals, so a UE determining link failure may listen on these synchronization resources for link reestablishment. Sidelink UEs may not transmit beam training signals on every beam training occasion, so to mitigate a beam failure event, both UEs may need to identify that a beam/link failure has occurred. However, during the beam failure event, one UE may not be able to send a failure indication to peer UEs over FR2.

In various aspects of techniques and apparatuses described herein, beam failure detection and beam failure recovery may be performed at unicast sidelink UEs and/or connected groupcast sidelink UEs. In some aspects, an Rx UE may receive SCI from a Tx UE. The Rx UE may determine an Rx side BLER based at least in part on the SCI. The Rx UE may perform a beam failure recovery based at least in part on the Rx side BLER satisfying a threshold. In some aspects, a Tx UE may determine a Tx side BLER based at least in part on whether feedback is received from the Rx UE over a PSFCH. The Tx UE may perform a beam failure recovery based at least in part on the Tx side BLER satisfying a threshold. As a result, both the Rx UE and the Tx UE may be able to detect a beam failure and initiate the beam failure recovery. The Rx UE and the Tx UE may detect the beam failure and resolve the beam failure without periodic reference signals between the Rx UE and the Tx UE.

In various aspects of techniques and apparatuses described herein, RLM may be performed based at least in part on data transmissions. For example, a UE, such as an Rx UE and/or a Tx UE, may detect a link/beam failure based at least in part on a measured BLER associated with SCI. The measured BLER may be an Rx side BLER when measured at a receiver side, or the measured BLER may be a Tx side BLER when measured at a transmitter side. The UE may determine the beam failure based at least in part on the measured BLER.

Figure 6:
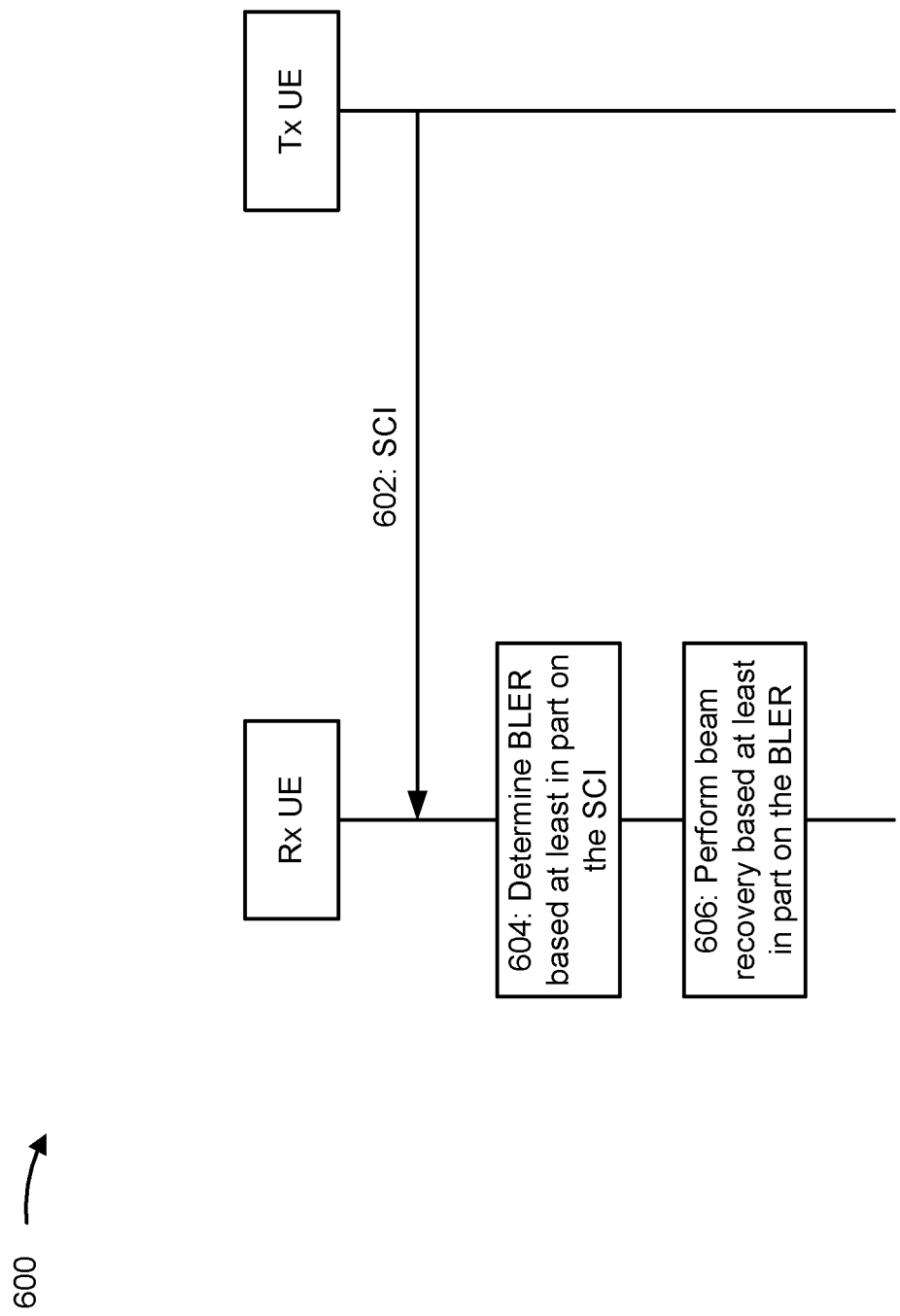
FIGS. 6-7 are diagrams illustrating examples associated with beam failure detection and recovery for sidelink UEs, in accordance with the present disclosure.

FIG. 6 is a diagram illustrating an example 600 of beam failure detection and recovery for sidelink UEs, in accordance with the present disclosure. As shown in FIG. 6, example 600 includes communication between an Rx UE (e.g., UE 120a) and a Tx UE (e.g., UE 120e). In some aspects, the Rx UE and the Tx UE may be included in a wireless network such as wireless network 100. In some aspects, the Rx UE and the Tx UE may communicate over a sidelink.

As shown by reference number 602, the Rx UE may receive SCI from the Tx UE. The SCI may include SCI-1 and/or SCI-2. The SCI may or may not be successfully received and/or decoded at the Rx UE.

As shown by reference number 604, the Rx UE may determine an Rx side BLER based at least in part on the SCI. In some aspects, the Rx UE may determine the Rx side BLER based at least in part on a number of SCI-2s and a total number of transmissions from the Tx UE over a configured sliding window. In some aspects, the Rx UE may determine the Rx side BLER based at least in part on a HARQ retransmission number indicated in the SCI-2 and a total number of transmissions from the Tx UE over a configured sliding window. In some aspects, the Rx UE may determine the Rx side BLER based at least in part on a sequential transmission counter indicated in SCIs received over a configured sliding window.

In some aspects, the Rx UE may measure the Rx side BLER based at least in part on whether SCI (e.g., SCI-1 and/or SCI-2) are decoded. As an example, the Rx side BLER may correspond to a first value (e.g., "0") when the SCI-2 is decoded, and the Rx side BLER may correspond to a second value (e.g., "1") when the SCI-2 is not decoded. Further, a measured Rx side BLER may be determined based at least in part on a number of SCI-2s that are decoded divided by a total number of transmissions from a Tx UE. In other words, the Rx side BLER may be based at least in part by:

$$BLER_{Rx} = \frac{\#SCI-2 \text{ decoded}}{\text{Total number of } Tx \text{ from the peer}},$$

where the Rx side BLER may be measured over a configured sliding window.

In some aspects, in case of a poor link (e.g., when a link/beam failure is present), the Rx UE may determine the Rx side BLER based at least in part on a HARQ retransmission number indicated in the SCI-2 and a total number of transmissions from the Tx UE over a configured sliding window. For example, if HARQ retransmission number 2 is received without receiving HARQ retransmission numbers 0 and 1, the measured Rx side BLER may be equal to $2/3$, or 0.66. As another example, the Rx UE may determine the Rx side BLER based at least in part on a sequential transmission counter in SCI (e.g., SCI-1 or SCI-2), where SCIs may be received over the configured sliding window. For example, in a BLER measurement window, if the UE receives packets 1001, 1003, 1005, 1010, and 1011, the measured BLER may be equal to $6/11$. In other words, 6 packets may be missing among 11 total packets. In some aspects, the BLER may be measured over a sliding window. The sliding window may be a preconfigured value or negotiated by peer UEs during a connection establishment/modification procedure.

In some aspects, the Rx UE may measure the Rx side BLER based at least in part on a PSCCH DMRS. The Rx UE may determine an SINR from an SCI-1 DMRS. The Rx UE may determine the SINR from the SCI-1 DMRS based at least in part on an SCI-2 decoding at the Rx UE. The SINR may be instantaneous, or the SINR may be an average over a sliding window. The Rx UE may map the SINR to an Rx side BLER based at least in part on a fixed SCI transport block size for sidelink communications. In other words, the Rx UE may obtain the measured Rx side BLER based at least in part on the SINR and the fixed SCI transport block size for sidelink communications.

As shown by reference number 606, the Rx UE may perform a beam failure recovery based at least in part on the Rx side BLER satisfying a threshold. The Rx UE may trigger the beam failure recovery based at least in part on the measured Rx side BLER. For example, the Rx UE may trigger the beam failure recovery based at least in part on the Rx side BLER being above a threshold (e.g., BLER-$_{Thresh}$=0.5).

As indicated above, FIG. 6 is provided as an example. Other examples may differ from what is described with respect to FIG. 6.

Figure 7:
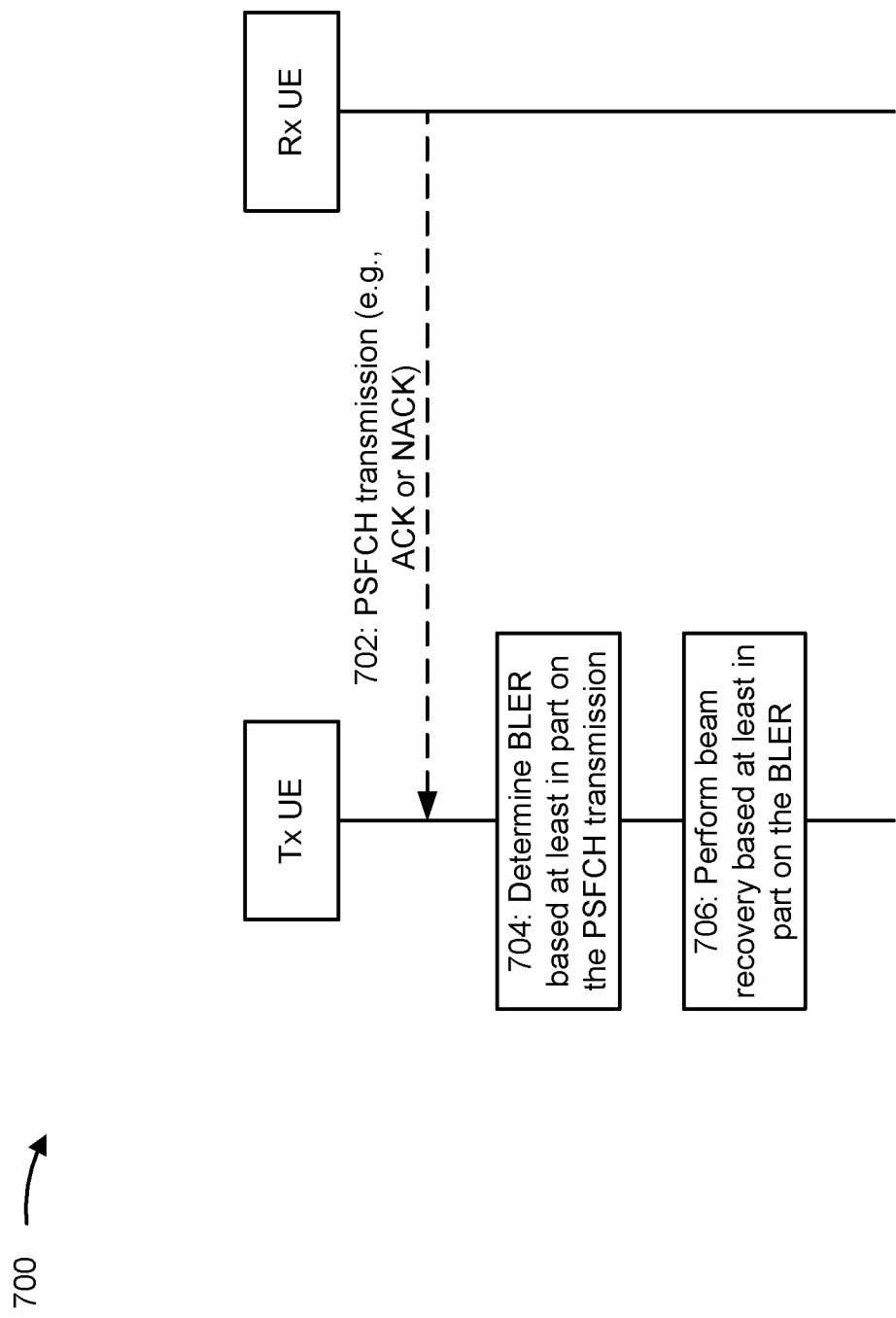

FIG. 7 is a diagram illustrating an example 700 of beam failure detection and recovery for sidelink UEs, in accordance with the present disclosure. As shown in FIG. 7, example 700 includes communication between a Tx UE (e.g., UE 120a) and an Rx UE (e.g., UE 120e). In some aspects, the Tx UE and the Rx UE may be included in a wireless network such as wireless network 100. In some aspects, the Tx UE and the Rx UE may communicate over a sidelink.

As shown by reference number 702, the Tx UE may receive a PSFCH transmission from the Rx UE. The PSFCH transmission may be an acknowledgement (ACK) or a negative acknowledgement (NACK).

As shown by reference number 704, the Tx UE may determine a Tx side BLER based at least in part on whether the PSFCH transmission is received from the Rx UE over a PSFCH. The PSFCH transmission may include ACK/NACK feedback received from the Rx UE.

In some aspects, the Tx UE may measure the Tx side BLER, since for unicast or connected groupcast, the Tx UE may have a more accurate measure of the Tx side BLER as compared to the Rx UE. In this case, the PSFCH may indicate both ACK and NACK. As an example, for a given transmission, if feedback is received (e.g., ACK/NACK), the Tx side BLER may be set to 0. In this case, SCI may be decoded though data may have failed. As another example, if no feedback is received for a transmission, the Tx side BLER may be set to 1, which may indicate an SCI decode failure.

In some aspects, the Tx UE may determine the Tx side BLER based at least in part on a number of PSFCH feedbacks received and a total number of transmissions with respect to the Rx UE. In other words, the Tx side BLER may be based at least in part by:

$$BLER_{Tx} = \frac{Num. \text{ of } PSFCH \text{ feedback received}}{\text{Total number of transmissions}},$$

where the number of PSFCH feedbacks received and the total number of transmissions may both be measured over a sliding window.

As shown by reference number 704, the Tx UE may perform a beam failure recovery based at least in part on the Tx side BLER satisfying a threshold. In some aspects, the Tx UE may perform a beam failure mitigation by increasing an SCI-2 robustness. The Tx UE may detect a beam/link failure event based at least in part on the Tx side BLER satisfying a threshold (e.g., $BLER_{Tx} \geq BLER_{Thresh}$). In some aspects, an MCS may be indicated by a beta offset of the SCI-2. When the MCS of the SCI-2 does not correspond to a minimum supported MCS, the Tx UE may decrease the MCS to a next lowest level to obtain an updated MCS. The Tx UE may use the updated MCS to measure the Tx side BLER over a measurement window. The Tx UE may further decrease the MCS and measure the Tx side BLER using the decreased MCS in an iterative manner until the Tx side BLER satisfies a threshold (e.g., until the Tx side BLER is below a threshold), or a minimum MCS is being used by the Tx UE. In some cases, the measurement window may be shorter than a preconfigured/negotiated sliding window for RLM.

In some aspects, the Tx UE may use an updated MCS (e.g., by decreasing the beta offset) of the SCI-2. The Tx UE may determine the Tx-side BLER based at least in part on the updated MCS and. For example, the MCS for the SCI-2 may be decreased iteratively until the BLER reduces or a lower MCS is reached.

As indicated above, FIG. 7 is provided as an example. Other examples may differ from what is described with respect to FIG. 7.

In some aspects, for bi-directional traffic, a UE, such as an Rx/Tx UE, may determine the Rx side BLER and/or the Tx side BLER. The UE may monitor one direction rather than the other (e.g., the Tx side BLER versus the Rx side BLER, or vice versa) based at least in part on a traffic periodicity, a traffic priority, a traffic type, etc. In some aspects, when the UE measures both the Rx side BLER and the Tx side BLER, the UE may determine a beam/link failure when the Rx side BLER and/or the Tx side BLER satisfy a threshold (e.g., $BLER \geq BLER_{Thresh}$).

In some aspects, for bi-directional traffic, a UE, such as an Rx/Tx UE, may detect a Tx side BLER to satisfy a threshold (e.g., the Tx side BLER is relatively high), and the UE may determine to reduce an MCS to mitigate a beam/link failure event. In some cases, the UE may determine that an Rx side BLER does not satisfy a threshold (e.g., the Rx side BLER is relatively low), but that a peer UE has not changed an SCI-2 coding for the peer UE. In these cases, the UE may transmit a reconfiguration message to the peer UE, where the reconfiguration message indicates for the peer UE to modify the SCI-2 coding for the peer UE. In other words, the UE may transmit the reconfiguration message with an indication to modify the MCS based at least in part on the Tx side BLER satisfying the threshold and the Rx side BLER not satisfying the threshold. In some aspects, when the beam/link failure event has not been resolved, UEs may perform a full beam sweep to reconfigure beam pair links.

In some aspects, during a link establishment or reconfiguration for beam/link failure mitigation, UEs may negotiate one or a set of BT-RSs and one or a set of RACH sequences or beam training response preambles to be used for the beam/link failure mitigation. In some aspects, during the link establishment or reconfiguration for beam/link failure mitigation, UEs may negotiate BT-RS and RACH sequences for a plurality of possible beam training purposes (e.g., all possible beam training purposes) including beam/link failure mitigation. In some aspects, UEs may also negotiate a fixed time division duplex (TDD) pattern to listen to connection requests from other UEs (or peer UEs) post RLF mitigation.

In some aspects, a first UE may detect a beam/link failure event with a second UE (or peer UE), and/or determine that control robustness may not resolve the beam/link failure event with the second UE. The first UE may be an Rx UE and the second UE may be a Tx UE, the first UE may be a Tx UE and the second UE may be an Rx UE, or the first and second UEs may both be Tx/Rx UEs. If the first UE was transmitting BT-RSs (or beam pilot signals) over the link that has failed, in a next system-wide resource allocation for beam training, the first UE may transmit the BT-RSs. For example, the first UE may transmit a BT-RS exhaustively on all directions. The BT-RS may be selected from a pre-negotiated set for beam training reference signals. The first UE may repeat the BT-RS over a next M beam training resources, or until the UE has established a new link with the second UE.

In some aspects, when a first UE determining RLF was receiving BT-RS from a second UE, the first UE may listen to a plurality of BT-RSs (e.g., all BT-RSs) on a next M system-wide beam training occasions. The first UE may transmit a preconfigured RACH sequence (or one from a set of RACH sequences) in directions with high BT-RS signal quality or power, as compared to other directions of the first UE.

In some aspects, based at least in part on a successful RACH, a first UE may transmit a BT-RS based at least in part on a negotiated TDD pattern. The first UE may listen on a direction over which the first UE determines a maximum RACH signal power (or a set of directions over which a RACH strength satisfies a threshold). A second UE transmitting RACH messages may send an RRC reconfiguration request message in directions corresponding to the RACH messages. The first UE may receive the RRC reconfiguration request message in a direction in which a RACH message is received from the second UE. The first UE may transmit a response on one or more directions based at least in part on a receipt of the RRC reconfiguration message. The first UE may select a dominant direction for subsequent sidelink communications with the second UE. In other words, the first UE may reestablish a beam/link with the second UE based at least in part on a power level associated with the one or more directions.

In some aspects, when a first UE monitors M system-wide resources but no link is established with a second UE, no viable link may be available for the first UE. An indication of no link may be transmitted to upper layers, and may possibly result in a session disconnection. In other words, the first UE may transmit an indication that a beam failure recovery is not successful to enable the session disconnection.

Figure 8:
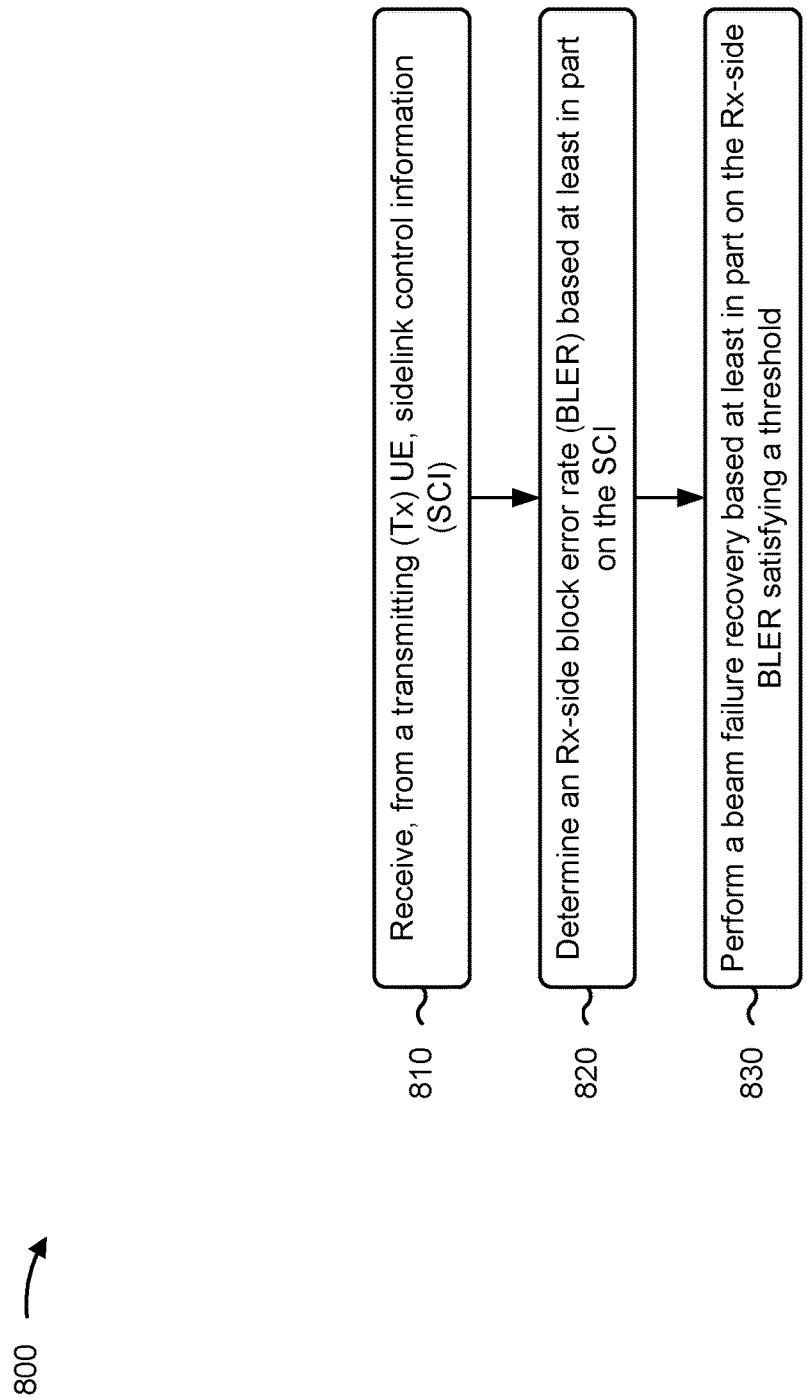
FIGS. 8-9 are diagrams illustrating example processes associated with beam failure detection and recovery for sidelink UEs, in accordance with the present disclosure.

FIG. 8 is a diagram illustrating an example process 800 performed, for example, by an Rx UE, in accordance with the present disclosure. Example process 800 is an example where the Rx UE (e.g., UE 120*a*) performs operations associated with beam failure detection and recovery for sidelink UEs.

As shown in FIG. 8, in some aspects, process 800 may include receiving, from a Tx UE, SCI (block 810). For example, the Rx UE (e.g., using reception component 1002, depicted in FIG. 10) may receive, from a Tx UE, SCI, as described above.

As further shown in FIG. 8, in some aspects, process 800 may include determining an Rx-side BLER based at least in part on the SCI (block 820). For example, the Rx UE (e.g., using determination component 1008, depicted in FIG. 10) may determine an Rx-side BLER based at least in part on the SCI, as described above.

As further shown in FIG. 8, in some aspects, process 800 may include performing a beam failure recovery based at least in part on the Rx-side BLER satisfying a threshold (block 830). For example, the Rx UE (e.g., using performance component 1010, depicted in FIG. 10) may perform a beam failure recovery based at least in part on the Rx-side BLER satisfying a threshold, as described above.

Process 800 may include additional aspects, such as any single aspect or any combination of aspects described below and/or in connection with one or more other processes described elsewhere herein.

In a first aspect, the SCI includes SCI-1 and SCI-2, and determining the Rx-side BLER comprises determining the Rx-side BLER based at least in part on a number of SCI-2s and a total number of transmissions from the Tx UE over a configured sliding window.

In a second aspect, alone or in combination with the first aspect, the configured sliding window is associated with a preconfigured value or is negotiated with the Tx UE during a connection establishment or modification procedure.

In a third aspect, alone or in combination with one or more of the first and second aspects, the SCI includes SCI-1 and SCI-2, and determining the Rx-side BLER comprises determining the Rx-side BLER based at least in part on a hybrid automatic repeat request retransmission number indicated in the SCI-2 and a total number of transmissions from the Tx UE over a configured sliding window.

In a fourth aspect, alone or in combination with one or more of the first through third aspects, determining the Rx-side BLER comprises determining the Rx-side BLER based at least in part on a sequential transmission counter indicated in SCIs received over a configured sliding window.

In a fifth aspect, alone or in combination with one or more of the first through fourth aspects, the SCI includes SCI-1 and SCI-2, determining the Rx-side BLER comprises determining an SINR from a DMRS associated with the SCI-1, the SINR is determined from the DMRS based at least in part on a decoding of the SCI-2, and determining the Rx-side BLER is based at least in part on the SINR and a fixed SCI transport block size and modulation and coding scheme.

In a sixth aspect, alone or in combination with one or more of the first through fifth aspects, determining the SINR comprises determining the SINR over a configured sliding window.

In a seventh aspect, alone or in combination with one or more of the first through sixth aspects, the Rx UE is a unicast sidelink UE or a connected groupcast sidelink UE.

In an eighth aspect, alone or in combination with one or more of the first through seventh aspects, the Rx UE is an Rx and Tx UE configured for bi-directional traffic, and process 800 further comprises determining one or more of the Rx-side BLER, a Tx-side BLER, or a combination thereof based at least in part on one of more of a traffic periodicity, a traffic priority, a traffic type, or a combination thereof, and determining a beam or link failure when one or both of the Rx-side BLER or the Tx-side BLER satisfies a threshold.

In a ninth aspect, alone or in combination with one or more of the first through eighth aspects, performing the beam failure recovery comprises receiving BT-RSs on system-wide beam training occasions, and transmitting a RACH sequence or a or beam training response preamble on a direction with a BT-RS signal quality or power that satisfies a threshold.

In a tenth aspect, alone or in combination with one or more of the first through ninth aspects, performing the beam failure recovery comprises detecting that the beam failure recovery is not successful and initiating a session disconnection.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
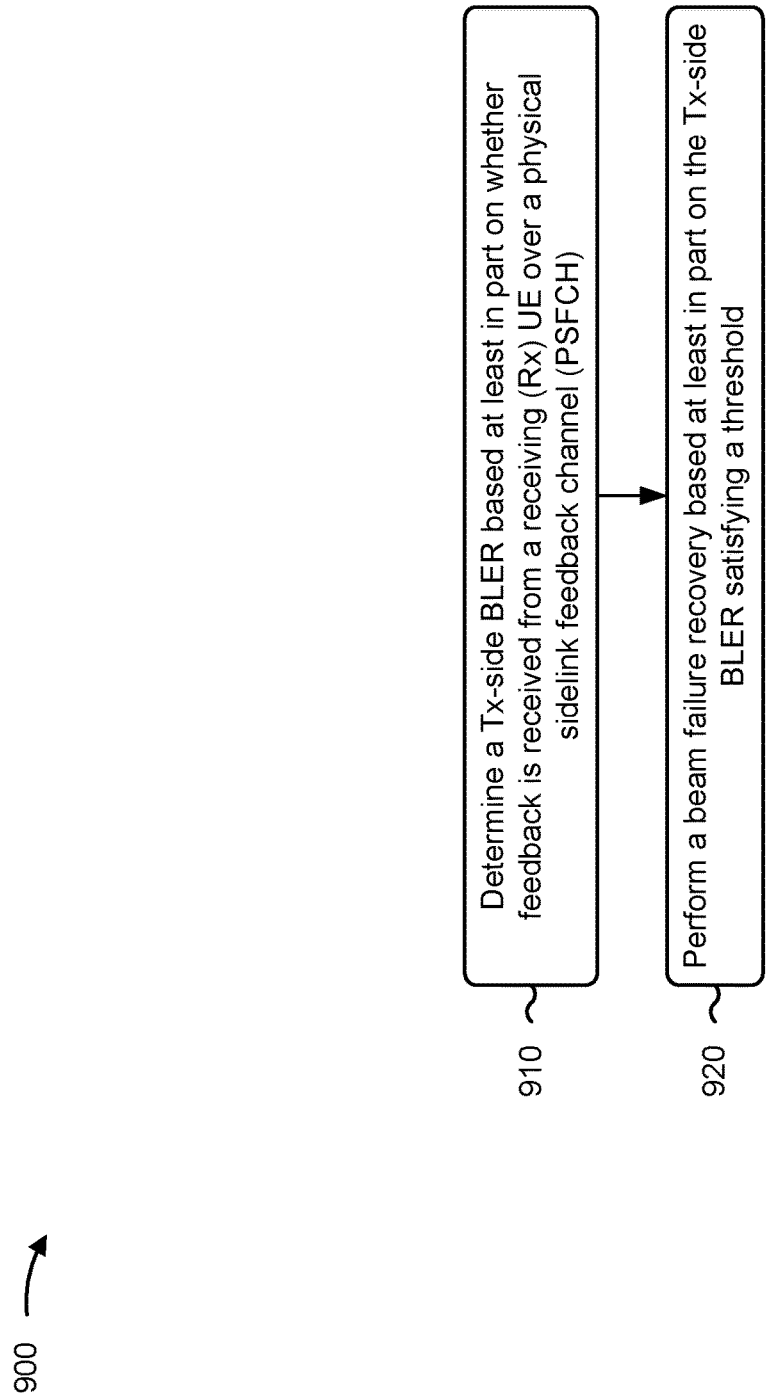

FIG. 9 is a diagram illustrating an example process 900 performed, for example, by a Tx UE, in accordance with the present disclosure. Example process 900 is an example where the Tx UE (e.g., UE 120*e*) performs operations associated with beam failure detection and recovery for sidelink UEs.

As shown in FIG. 9, in some aspects, process 900 may include determining a Tx-side BLER based at least in part on whether feedback is received from an Rx UE over a PSFCH (block 910). For example, the Tx UE (e.g., using determination component 1108, depicted in FIG. 11) may determine a Tx-side BLER based at least in part on whether feedback is received from an Rx UE over a PSFCH, as described above.

As further shown in FIG. 9, in some aspects, process 900 may include performing a beam failure recovery based at least in part on the Tx-side BLER satisfying a threshold (block 920). For example, the Tx UE (e.g., using performance component 1110, depicted in FIG. 11) may perform a beam failure recovery based at least in part on the Tx-side BLER satisfying a threshold, as described above.

Process 900 may include additional aspects, such as any single aspect or any combination of aspects described below and/or in connection with one or more other processes described elsewhere herein.

In a first aspect, determining the Tx-side BLER comprises determining the Tx-side BLER based at least in part on whether an acknowledgement or a negative acknowledgement is received from the Rx UE.

In a second aspect, alone or in combination with the first aspect, determining the Tx-side BLER comprises determining the Tx-side BLER based at least in part on no feedback being received from the Rx UE.

In a third aspect, alone or in combination with one or more of the first and second aspects, determining the Tx-side BLER comprises determining the Tx-side BLER based at least in part on a number of feedback messages received over the PSFCH from the Rx UE over a configured sliding window and a total number of transmissions from the Rx UE over the configured sliding window.

In a fourth aspect, alone or in combination with one or more of the first through third aspects, the Tx UE is a unicast sidelink UE or a connected groupcast sidelink UE.

In a fifth aspect, alone or in combination with one or more of the first through fourth aspects, performing the beam failure recovery comprises decreasing an MCS associated with an SCI-2 to obtain an updated MCS, and determining the Tx-side BLER based at least in part on the updated MCS.

In a sixth aspect, alone or in combination with one or more of the first through fifth aspects, the Tx UE is an Rx and Tx UE configured for bi-directional traffic, and performing the beam failure recovery comprises transmitting, to the Rx UE, a reconfiguration message indicating for the Rx UE to modify an MCS associated with an SCI-2, based at least in part on the Tx-side BLER satisfying the threshold and an Rx-side BLER not satisfying the threshold.

In a seventh aspect, alone or in combination with one or more of the first through sixth aspects, performing the beam failure recovery comprises performing a beam sweep to reconfigure beam pair links with the Rx UE.

In an eighth aspect, alone or in combination with one or more of the first through seventh aspects, performing the beam failure recovery comprises negotiating, with the Rx UE during a session establishment or modification, one or more beam training reference signals and one or more random access channel sequences for the beam failure recovery.

In a ninth aspect, alone or in combination with one or more of the first through eighth aspects, performing the beam failure recovery comprises negotiating, with the Rx UE, one or more beam training reference signals and one or more random access channel sequences for beam training including the beam failure recovery.

In a tenth aspect, alone or in combination with one or more of the first through ninth aspects, performing the beam failure recovery comprises negotiating, with the Rx UE, a fixed time division duplex pattern to listen for connection requests from the Rx UE after the beam failure is mitigated.

In an eleventh aspect, alone or in combination with one or more of the first through tenth aspects, performing the beam failure recovery comprises transmitting BT-RSs in a plurality of directions in a system-wide resource allocated for beam training, the BT-RSs are selected from a pre-negotiated set for BT-RSs, and the BT-RSs are transmitted until a new link is established with the Rx UE.

In a twelfth aspect, alone or in combination with one or more of the first through eleventh aspects, performing the beam failure recovery comprises transmitting BT-RSs based at least in part on a negotiated time division duplex pattern; receiving, from the Rx UE, an RRC reconfiguration request message, where the RRC reconfiguration request message is received in a direction that corresponds to a direction at which a random access channel message is received from the Rx UE; transmitting a response in one or more directions based at least in part on a receipt of the RRC reconfiguration request message; and reestablishing a link with the Rx UE based at least in part on a power level associated with the one or more directions.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
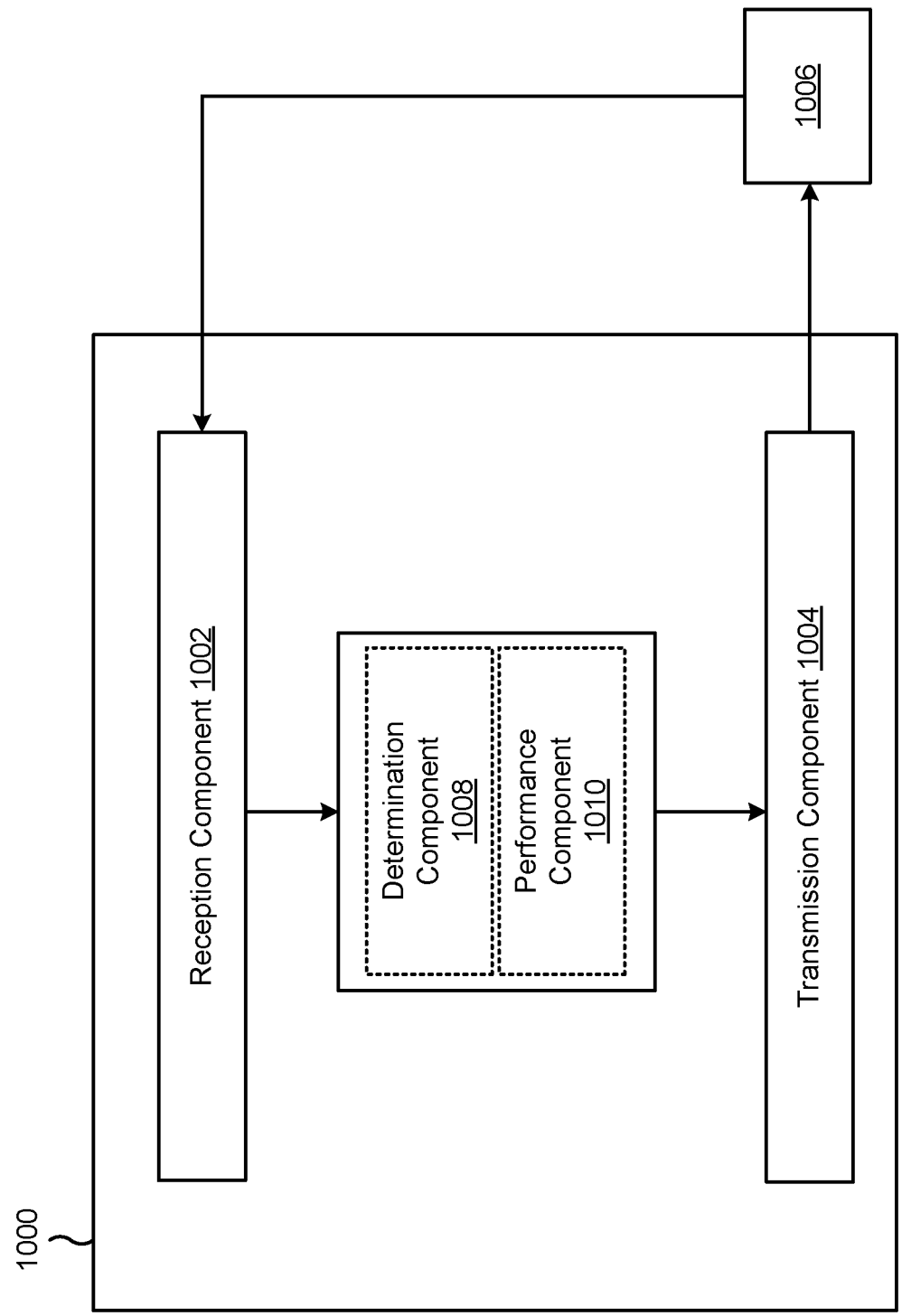
FIG. 10 is a block diagram of an example apparatus for wireless communication, in accordance with the present disclosure.

FIG. 10 is a block diagram of an example apparatus 1000 for wireless communication. The apparatus 1000 may be an Rx UE, or an Rx UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a determination component 1008, or a performance component 1010, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the Rx UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the Rx UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the Rx UE described above in connection with FIG. 2. In some aspects, the transmission component 1004 may be co-located with the reception component 1002 in a transceiver.

The reception component 1002 may receive, from a Tx UE, SCI. The determination component 1008 may determine an Rx-side BLER based at least in part on the SCI. The performance component 1010 may perform a beam failure recovery based at least in part on the Rx-side BLER satisfying a threshold.

The determination component 1008 may determine the Rx-side BLER based at least in part on a number of SCI-2s and a total number of transmissions from the Tx UE over a configured sliding window.

The determination component 1008 may determine the Rx-side BLER based at least in part on a hybrid automatic repeat request retransmission number indicated in the SCI-2 and a total number of transmissions from the Tx UE over a configured sliding window.

The determination component 1008 may determine the Rx-side BLER based at least in part on a sequential transmission counter indicated in SCIs received over a configured sliding window.

The determination component 1008 may determine an SINR from a DMRS associated with the SCI-1, wherein the SINR is determined from the DMRS based at least in part on a decoding of the SCI-2. The determination component 1008 may determine the Rx-side BLER based at least in part on the SINR and a fixed SCI transport block size. The determination component 1008 may determine the SINR over a configured sliding window.

The determination component 1008 may determine one or more of the Rx-side BLER, a Tx-side BLER, or a combination thereof based at least in part on one of more of: a traffic periodicity, a traffic priority, a traffic type, or a combination thereof; and determine a beam or link failure when one or both of the Rx-side BLER or the Tx-side BLER satisfies a threshold.

The performance component 1010 may receive BT-RSs on system-wide beam training occasions, and transmit a RACH sequence on a direction with a BT-RS signal quality or power that satisfies a threshold.

The performance component 1010 may transmit an indication that the beam failure recovery is not successful to enable a session disconnection.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
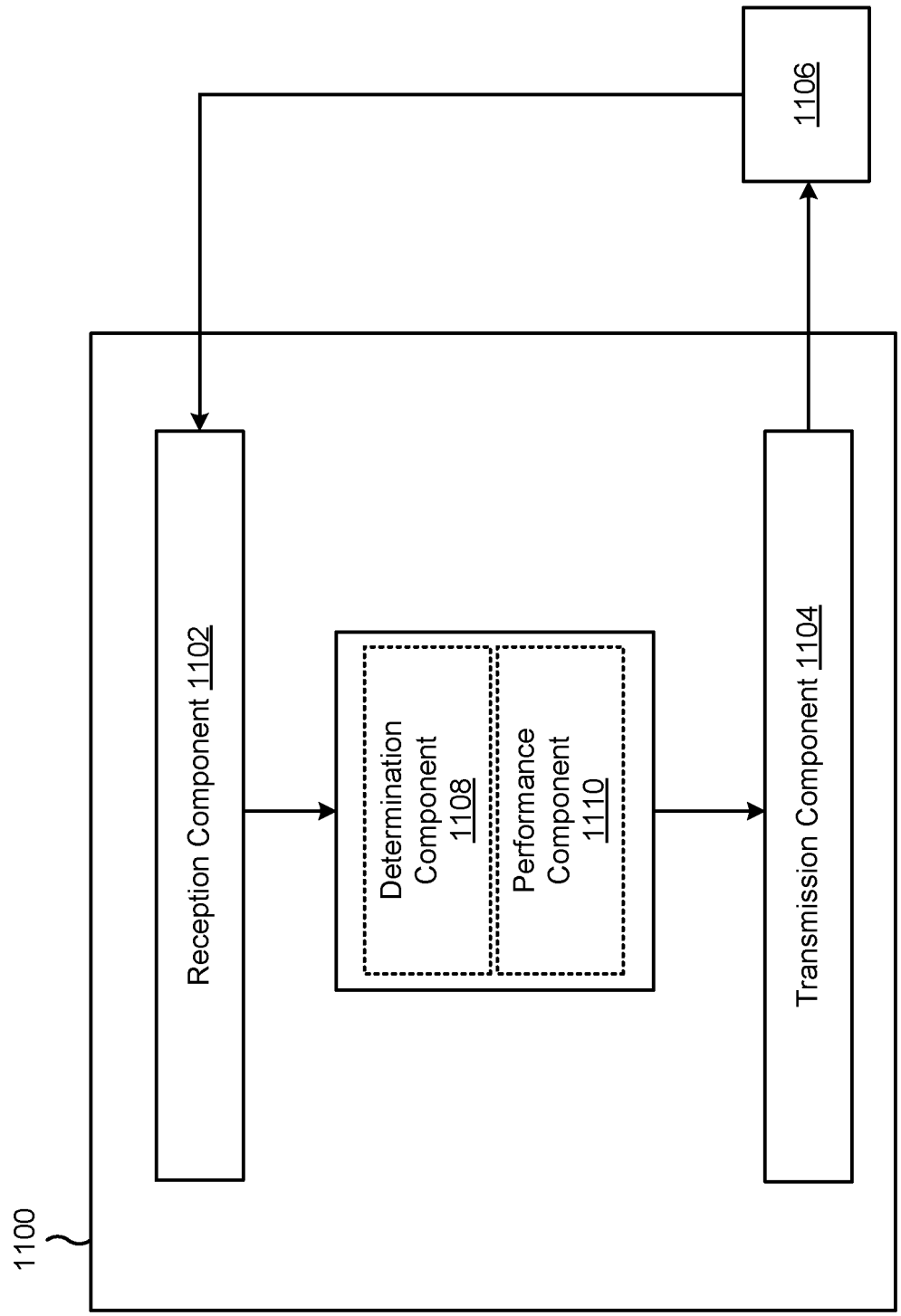
FIG. 11 is a block diagram of an example apparatus for wireless communication, in accordance with the present disclosure.

FIG. 11 is a block diagram of an example apparatus 1100 for wireless communication. The apparatus 1100 may be a Tx UE, or a Tx UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a determination component 1108, or a performance component 1110, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the Tx UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the Tx UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the Tx UE described above in connection with FIG. 2. In some aspects, the transmission component 1104 may be co-located with the reception component 1102 in a transceiver.

The determination component 1108 may determine a Tx-side BLER based at least in part on whether feedback is received from an Rx UE over a PSFCH. The performance component 1110 may perform a beam failure recovery based at least in part on the Tx-side BLER satisfying a threshold.

The determination component 1108 may determine the Tx-side BLER based at least in part on whether an acknowledgement or a negative acknowledgement is received from the Rx UE.

The determination component 1108 may determine the Tx-side BLER based at least in part on no feedback being received from the Rx UE.

The determination component 1108 may determine the Tx-side BLER based at least in part on a number of feedback messages received over the PSFCH from the Rx UE over a configured sliding window and a total number of transmissions from the Rx UE over the configured sliding window.

The performance component 1110 may decrease an MCS associated with an SCI-2 to obtain an updated MCS, and determine the Tx-side BLER based at least in part on the updated MCS.

The performance component 1110 may transmit, to the Rx UE, a reconfiguration message indicating for the Rx UE to modify an MCS associated with an SCI-2, based at least in part on the Tx-side BLER satisfying the threshold and an Rx-side BLER not satisfying the threshold.

The performance component 1110 may perform a beam sweep to reconfigure beam pair links with the Rx UE.

The performance component 1110 may negotiate, with the Rx UE, one or more beam training reference signals and one or more random access channel sequences for the beam failure recovery.

The performance component 1110 may negotiate, with the Rx UE, one or more beam training reference signals and one or more random access channel sequences for beam training including the beam failure recovery.

The performance component 1110 may negotiate, with the Rx UE, a fixed time division duplex pattern to listen for connection requests from the Rx UE after the beam failure is mitigated.

The performance component 1110 may transmit BT-RSs in a plurality of directions in a system-wide resource allocated for beam training, where the BT-RSs are selected from a pre-negotiated set for BT-RSs, and the BT-RSs are transmitted until a new link is established with the Rx UE.

The performance component 1110 may transmit BT-RSs based at least in part on a negotiated time division duplex pattern. The performance component 1110 may receive, from the Rx UE, an RRC reconfiguration request message, where the RRC reconfiguration request message is received in a direction that corresponds to a direction at which a random access channel message is received from the Rx UE. The performance component 1110 may transmit a response in one or more directions based at least in part on a receipt of the RRC reconfiguration request message. The performance component 1110 may reestablish a link with the Rx UE based at least in part on a power level associated with the one or more directions.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some aspects of the present disclosure:

Aspect 1: A method of wireless communication performed by a receiving (Rx) user equipment (UE), comprising: receiving, from a transmitting (Tx) UE, sidelink control information (SCI); determining an Rx-side block error rate (BLER) based at least in part on the SCI; and performing a beam failure recovery based at least in part on the Rx-side BLER satisfying a threshold.

Aspect 2: The method of aspect 1, wherein the SCI includes sidelink control information part 1 (SCI-1) and sidelink control information part 2 (SCI-2), and determining the Rx-side BLER comprises determining the Rx-side BLER based at least in part on a number of SCI-2s and a total number of transmissions from the Tx UE over a configured sliding window.

Aspect 3: The method of any of aspects 1 through 2, wherein the configured sliding window is associated with a preconfigured value or is negotiated with the Tx UE during a connection establishment or modification procedure.

Aspect 4: The method of any of aspects 1 through 3, wherein the SCI includes sidelink control information part 1 (SCI-1) and sidelink control information part 2 (SCI-2), and determining the Rx-side BLER comprises determining the Rx-side BLER based at least in part on a hybrid automatic repeat request retransmission number indicated in the SCI-2 and a total number of transmissions from the Tx UE over a configured sliding window.

Aspect 5: The method of any of aspects 1 through 4, wherein determining the Rx-side BLER comprises determining the Rx-side BLER based at least in part on a sequential transmission counter indicated in SCIs received over a configured sliding window.

Aspect 6: The method of any of aspects 1 through 5, wherein the SCI includes sidelink control information part 1 (SCI-1) and sidelink control information part 2 (SCI-2), and determining the Rx-side BLER comprises: determining a signal-to-interference-plus-noise ratio (SINR) from a demodulation reference signal (DMRS) associated with the SCI-1, and wherein the SINR is determined from the DMRS based at least in part on a decoding of the SCI-2; and determining the Rx-side BLER based at least in part on the SINR and a fixed SCI transport block size and modulation and coding scheme.

Aspect 7: The method of aspect 6, wherein determining the SINR comprises determining the SINR over a configured sliding window.

Aspect 8: The method of any of aspects 1 through 7, wherein the Rx UE is a unicast sidelink UE or a connected groupcast sidelink UE.

Aspect 9: The method of any of aspects 1 through 8, wherein the Rx UE is an Rx and Tx UE configured for bi-directional traffic, and the method further comprising: determining one or more of the Rx-side BLER, a Tx-side BLER, or a combination thereof based at least in part on one of more of: a traffic periodicity, a traffic priority, a traffic type, or a combination thereof; and determining a beam or link failure when one or both of the Rx-side BLER or the Tx-side BLER satisfies a threshold.

Aspect 10: The method of any of aspects 1 through 9, wherein performing the beam failure recovery comprises: receiving beam training reference signals (BT-RSs) on system-wide beam training occasions; and transmitting a random access channel (RACH) sequence or a beam training response preamble on a direction with a BT-RS signal quality or power that satisfies a threshold.

Aspect 11: The method of any of aspects 1 through 10, wherein performing the beam failure recovery comprises: detecting that the beam failure recovery is not successful and initiate a session disconnection.

Aspect 12: A method of wireless communication performed by a transmitting (Tx) user equipment (UE), comprising: determining a Tx-side block error rate (BLER) based at least in part on whether feedback is received from a receiving (Rx) UE over a physical sidelink feedback channel (PSFCH); and performing a beam failure recovery based at least in part on the Tx-side BLER satisfying a threshold.

Aspect 13: The method of aspect 12, wherein determining the Tx-side BLER comprises determining the Tx-side BLER based at least in part on whether an acknowledgement or a negative acknowledgement is received from the Rx UE.

Aspect 14: The method of any of aspects 12 through 13, wherein determining the Tx-side BLER comprises determining the Tx-side BLER based at least in part on no feedback being received from the Rx UE.

Aspect 15: The method of any of aspects 12 through 14, wherein determining the Tx-side BLER comprises determining the Tx-side BLER based at least in part on a number of feedback messages received over the PSFCH from the Rx UE over a configured sliding window and a total number of transmissions from the Rx UE over the configured sliding window.

Aspect 16: The method of any of aspects 12 through 15, wherein the Tx UE is a unicast sidelink UE or a connected groupcast sidelink UE.

Aspect 17: The method of any of aspects 12 through 16, wherein performing the beam failure recovery comprises: decreasing an MCS associated with a sidelink control information part 2 (SCI-2) to obtain an updated MCS; and determining the Tx-side BLER based at least in part on the updated MCS.

Aspect 18: The method of any of aspects 12 through 17, wherein the Tx UE is an Rx and Tx UE configured for bi-directional traffic, and performing the beam failure recovery comprises: transmitting, to the Rx UE, a reconfiguration message indicating for the Rx UE to modify an MCS associated with a sidelink control information part 2 (SCI-2), based at least in part on the Tx-side BLER satisfying the threshold and an Rx-side BLER not satisfying the threshold.

Aspect 19: The method of any of aspects 12 through 18, wherein performing the beam failure recovery comprises: performing a beam sweep to reconfigure beam pair links with the Rx UE.

Aspect 20: The method of any of aspects 12 through 19, wherein performing the beam failure recovery comprises: negotiating, with the Rx UE, one or more beam training reference signals and one or more random access channel sequences for the beam failure recovery.

Aspect 21: The method of any of aspects 12 through 20, wherein performing the beam failure recovery comprises: negotiating, with the Rx UE, one or more beam training reference signals and one or more random access channel sequences or beam training response preambles for beam training including the beam failure recovery.

Aspect 22: The method of any of aspects 12 through 21, wherein performing the beam failure recovery comprises: negotiating, with the Rx UE, a fixed time division duplex pattern to listen for connection requests from the Rx UE after the beam failure is mitigated.

Aspect 23: The method of any of aspects 12 through 22, wherein performing the beam failure recovery comprises: transmitting beam training reference signals (BT-RSs) in a plurality of directions in a system-wide resource allocated for beam training, wherein the BT-RSs are selected from a pre-negotiated set for BT-RSs, and wherein the BT-RSs are transmitted until a new link is established with the Rx UE.

Aspect 24: The method of any of aspects 12 through 23, wherein performing the beam failure recovery comprises: transmitting beam training reference signals (BT-RSs) based at least in part on a negotiated time division duplex pattern; receiving, from the Rx UE, a radio resource control (RRC) reconfiguration request message, wherein the RRC reconfiguration request message is received in a direction that corresponds to a direction at which a random access channel message is received from the Rx UE; transmitting a response in one or more directions based at least in part on a receipt of the RRC reconfiguration request message; and reestablishing a link with the Rx UE based at least in part on a power level associated with the one or more directions.

Aspect 25: An apparatus for wireless communication at a device, comprising a processor; memory coupled with the processor; and instructions stored in the memory and executable by the processor to cause the apparatus to perform the method of one or more aspects of aspects 1-11.

Aspect 26: A device for wireless communication, comprising a memory and one or more processors coupled to the memory, the memory and the one or more processors configured to perform the method of one or more aspects of aspects 1-11.

Aspect 27: An apparatus for wireless communication, comprising at least one means for performing the method of one or more aspects of aspects 1-11.

Aspect 28: A non-transitory computer-readable medium storing code for wireless communication, the code comprising instructions executable by a processor to perform the method of one or more aspects of aspects 1-11.

Aspect 29: A non-transitory computer-readable medium storing a set of instructions for wireless communication, the set of instructions comprising one or more instructions that, when executed by one or more processors of a device, cause the device to perform the method of one or more aspects of aspects 1-11.

Aspect 30: An apparatus for wireless communication at a device, comprising a processor; memory coupled with the processor; and instructions stored in the memory and executable by the processor to cause the apparatus to perform the method of one or more aspects of aspects 12-24.

Aspect 31: A device for wireless communication, comprising a memory and one or more processors coupled to the memory, the memory and the one or more processors configured to perform the method of one or more aspects of aspects 12-24.

Aspect 32: An apparatus for wireless communication, comprising at least one means for performing the method of one or more aspects of aspects 12-24.

Aspect 33: A non-transitory computer-readable medium storing code for wireless communication, the code comprising instructions executable by a processor to perform the method of one or more aspects of aspects 12-24.

Aspect 34: A non-transitory computer-readable medium storing a set of instructions for wireless communication, the set of instructions comprising one or more instructions that, when executed by one or more processors of a device, cause the device to perform the method of one or more aspects of aspects 12-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a receiving (Rx) user equipment (UE), comprising:
    receiving, from a transmitting (Tx) UE, sidelink control information (SCI) that includes sidelink control information part 1 (SCI-1) and sidelink control information part 2 (SCI-2);
    determining an Rx-side block error rate (BLER) based at least in part on the SCI and at least two of:
        a number of SCI-2s over a configured sliding window,
        a total number of transmissions from the Tx UE over the configured sliding window,
        a hybrid automatic repeat request retransmission number indicated in the SCI-2,
        a sequential transmission counter indicated in SCIs received over the configured sliding window,
        a signal-to-interference-plus-noise ratio (SINR) from a demodulation reference signal (DMRS) associated with the SCI-1, or
        a fixed SCI transport block size and modulation and coding scheme; and
    performing a beam failure recovery based at least in part on the Rx-side BLER satisfying a threshold.

2. The method of claim 1, wherein the configured sliding window is associated with a preconfigured value or is negotiated with the Tx UE during a connection establishment or modification procedure.

3. The method of claim 1, wherein the SINR is determined over the configured sliding window.

4. The method of claim 1, wherein the Rx UE is a unicast sidelink UE or a connected groupcast sidelink UE.

5. The method of claim 1, wherein the Rx UE is an Rx and Tx UE configured for bi-directional traffic, and the method further comprising:
    determining one or more of the Rx-side BLER, a Tx-side BLER, or a combination thereof based at least in part on one of more of: a traffic periodicity, a traffic priority, a traffic type, or a combination thereof; and
    determining a beam or link failure when one or both of the Rx-side BLER or the Tx-side BLER satisfies a threshold.

6. The method of claim 1, wherein performing the beam failure recovery comprises:

receiving beam training reference signals (BT-RSs) on system-wide beam training occasions; and transmitting a random access channel (RACH) sequence or a beam training response preamble on a direction with a BT-RS signal quality or power that satisfies a threshold.

7. The method of claim 1, wherein performing the beam failure recovery comprises:
detecting that the beam failure recovery is not successful and initiate a session disconnection.

8. A method of wireless communication performed by a transmitting (Tx) user equipment (UE), comprising:
determining a Tx-side block error rate (BLER) based at least in part on whether feedback is received from a receiving (Rx) UE over a physical sidelink feedback channel (PSFCH) and at least one of:
whether an acknowledgement or a negative acknowledgement is received from the Rx UE,
no feedback being received from the Rx UE, or
a number of feedback messages received over the PSFCH from the Rx UE over a configured sliding window and a total number of transmissions from the Rx UE over the configured sliding window; and
performing a beam failure recovery based at least in part on the Tx-side BLER satisfying a threshold.

9. The method of claim 8, wherein the Tx UE is a unicast sidelink UE or a connected groupcast sidelink UE.

10. The method of claim 8, wherein performing the beam failure recovery comprises:
decreasing a modulation and coding scheme (MCS) associated with a sidelink control information part 2 (SCI-2) to obtain an updated MCS; and
determining the Tx-side BLER based at least in part on the updated MCS.

11. The method of claim 8, wherein the Tx UE is an Rx and Tx UE configured for bi-directional traffic, and performing the beam failure recovery comprises:
transmitting, to the Rx UE, a reconfiguration message indicating for the Rx UE to modify a modulation and coding scheme associated with a sidelink control information part 2 (SCI-2), based at least in part on the Tx-side BLER satisfying the threshold and an Rx-side BLER not satisfying the threshold.

12. The method of claim 8, wherein performing the beam failure recovery comprises:
performing a beam sweep to reconfigure beam pair links with the Rx UE.

13. The method of claim 8, wherein performing the beam failure recovery comprises:
negotiating, with the Rx UE, one or more beam training reference signals and one or more random access channel sequences for the beam failure recovery.

14. The method of claim 8, wherein performing the beam failure recovery comprises:
negotiating, with the Rx UE, one or more beam training reference signals and one or more random access channel sequences or beam training response preambles for beam training including the beam failure recovery.

15. The method of claim 8, wherein performing the beam failure recovery comprises:
negotiating, with the Rx UE, a fixed time division duplex pattern to listen for connection requests from the Rx UE after the beam failure is mitigated.

16. The method of claim 8, wherein performing the beam failure recovery comprises:

transmitting beam training reference signals (BT-RSs) in a plurality of directions in a system-wide resource allocated for beam training, wherein the BT-RSs are selected from a pre-negotiated set for BT-RSs, and wherein the BT-RSs are transmitted until a new link is established with the Rx UE.

17. The method of claim 8, wherein performing the beam failure recovery comprises:
transmitting beam training reference signals (BT-RSs) based at least in part on a negotiated time division duplex pattern;
receiving, from the Rx UE, a radio resource control (RRC) reconfiguration request message, wherein the RRC reconfiguration request message is received in a direction that corresponds to a direction at which a random access channel message is received from the Rx UE;
transmitting a response in one or more directions based at least in part on a receipt of the RRC reconfiguration request message; and
reestablishing a link with the Rx UE based at least in part on a power level associated with the one or more directions.

18. A receiving (Rx) user equipment (UE) for wireless communication, comprising:
a memory; and
one or more processors coupled to the memory, the one or more processors configured to:
receive, from a transmitting (Tx) UE, sidelink control information (SCI) that includes sidelink control information part 1 (SCI-1) and sidelink control information part 2 (SCI-2);
determine an Rx-side block error rate (BLER) based at least in part on the SCI and at least two of:
a number of SCI-2s over a configured sliding window,
a total number of transmissions from the Tx UE over the configured sliding window,
a hybrid automatic repeat request retransmission number indicated in the SCI-2,
a sequential transmission counter indicated in SCIs received over the configured sliding window,
a signal-to-interference-plus-noise ratio (SINR) from a demodulation reference signal (DMRS) associated with the SCI-1, or
a fixed SCI transport block size and modulation and coding scheme; and
perform a beam failure recovery based at least in part on the Rx-side BLER satisfying a threshold.

19. The Rx UE of claim 18, wherein the configured sliding window is associated with a preconfigured value or is negotiated with the Tx UE during a connection establishment or modification procedure.

20. A transmitting (Tx) user equipment (UE) for wireless communication, comprising:
a memory; and
one or more processors coupled to the memory, the one or more processors configured to:
determine a Tx-side block error rate (BLER) based at least in part on whether feedback is received from a receiving (Rx) UE over a physical sidelink feedback channel (PSFCH); and
perform a beam failure recovery based at least in part on the Tx-side BLER satisfying a threshold.

21. The Rx UE of claim 18, wherein the SINK is determined over the configured sliding window.

22. The Rx UE of claim 18, wherein the Rx UE is a unicast sidelink UE or a connected groupcast sidelink UE.

23. The Rx UE of claim 18, wherein the Rx UE is an Rx and Tx UE configured for bi-directional traffic, and wherein the one or more processors are further configured to:
  determine one or more of the Rx-side BLER, a Tx-side BLER, or a combination thereof based at least in part on one of more of: a traffic periodicity, a traffic priority, a traffic type, or a combination thereof; and
  determine a beam or link failure when one or both of the Rx-side BLER or the Tx-side BLER satisfies a threshold.

24. The Rx UE of claim 18, wherein the one or more processors, to perform the beam failure recovery, are configured to:
  receive beam training reference signals (BT-RSs) on system-wide beam training occasions; and
  transmit a random access channel (RACH) sequence or a beam training response preamble on a direction with a BT-RS signal quality or power that satisfies a threshold.

25. The Rx UE of claim 18, wherein the one or more processors, to perform the beam failure recovery, are configured to:
  detect that the beam failure recovery is not successful and initiate a session disconnection.

26. The Tx UE of claim 20, wherein the Tx UE is a unicast sidelink UE or a connected groupcast sidelink UE.

27. The Tx UE of claim 20, wherein the one or more processors, to perform the beam failure recovery, are configured to:
  decrease a modulation and coding scheme (MCS) associated with a sidelink control information part 2 (SCI-2) to obtain an updated MCS; and
  determine the Tx-side BLER based at least in part on the updated MCS.

28. The Tx UE of claim 20, wherein the Tx UE is an Rx and Tx UE configured for bi-directional traffic, and wherein the one or more processors are further configured to:
  transmit, to the Rx UE, a reconfiguration message indicating for the Rx UE to modify a modulation and coding scheme associated with a sidelink control information part 2 (SCI-2), based at least in part on the Tx-side BLER satisfying the threshold and an Rx-side BLER not satisfying the threshold.

29. The Tx UE of claim 20, wherein the one or more processors, to perform the beam failure recovery, are configured to:
  perform a beam sweep to reconfigure beam pair links with the Rx UE.

30. The Tx UE of claim 20, wherein the one or more processors, to perform the beam failure recovery, are configured to:
  negotiate, with the Rx UE, one or more beam training reference signals and one or more random access channel sequences for the beam failure recovery.

\* \* \* \* \*